United States Patent
Sanjeewa (10) Patent No.: US 7,933,997 B2
(45) Date of Patent: Apr. 26, 2011

(54) COMMUNICATION APPARATUS, COMMUNICATION SYSTEM, PROGRAM AND COMMUNICATION METHOD

(75) Inventor: Ranatunga Vijitha Sanjeewa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/648,597

(22) Filed: Dec. 29, 2009

(65) Prior Publication Data

US 2010/0185780 A1    Jul. 22, 2010

(30) Foreign Application Priority Data

Jan. 22, 2009    (JP) ................................. 2009-012276

(51) Int. Cl.
*H04L 12/28* (2006.01)
(52) U.S. Cl. ......... 709/226; 709/232; 370/238; 370/351
(58) Field of Classification Search .................. 709/226, 709/232; 370/238, 351
See application file for complete search history.

(56) References Cited

U.S. PATENT DOCUMENTS

| | | | | |
|---|---|---|---|---|
| 7,613,122 | B2 * | 11/2009 | Nishimura | 370/238 |
| 2003/0182437 | A1 * | 9/2003 | Kobayashi et al. | 709/232 |
| 2004/0114681 | A1 * | 6/2004 | Rotstein et al. | 375/231 |
| 2006/0140167 | A1 * | 6/2006 | Nishimura | 370/351 |
| 2007/0038753 | A1 * | 2/2007 | Jorgensen | 709/226 |

FOREIGN PATENT DOCUMENTS

| | | |
|---|---|---|
| JP | 2005-198111 | 7/2005 |
| WO | WO 2005/114919 A1 | 12/2005 |
| WO | WO 2005/114943 A2 | 12/2005 |
| WO | WO 2005/114950 A1 | 12/2005 |
| WO | WO 2005/115009 A1 | 12/2005 |

* cited by examiner

*Primary Examiner* — Khanh Q Dinh
(74) *Attorney, Agent, or Firm* — Oblon, Spivak, McClelland, Maier & Neustadt, L.L.P.

(57) ABSTRACT

There is provided a communication apparatus including: a transmission unit which transmits data to an opposite communication apparatus; a physical band measurement unit which measures a physical band against the opposite communication apparatus; and a rate control unit which controls a transmission rate of the transmission unit within a range of the physical band when a previous transmission rate of the transmission unit is below a value of subtracting a predetermined value from the physical band and within a range of exceeding the physical band when the previous transmission rate is beyond the value of subtracting the predetermined value from the physical band.

8 Claims, 7 Drawing Sheets

COMMUNICATION APPARATUS, COMMUNICATION SYSTEM, PROGRAM AND COMMUNICATION METHOD

BACKGROUND OF THE INVENTION

1. Field of the Invention

The present invention relates to a communication apparatus, a communication system, a program and a communication method.

2. Description of the Related Art

In recent years, with speed-up in the Internet, network applications utilizing the Internet have been in widespread use. Since the Internet is the best effort type, such network applications perform congestion control based on a user datagram protocol (UDP) or a transmission control protocol (TCP).

Further, a network application such as a video streaming performs rate control at network traffic in order to maintain real-time performance. The rate control utilizes TCP friendly rate control (TFRC) to calculate a possible transmission rate from a packet loss rate and round trip time (RTT), for example.

The rate control at such network traffic has been described in Japanese Patent Application Laid-Open No. 2007-537682, No. 2005-198111 and the like.

SUMMARY OF THE INVENTION

Here, with the rate control based on TFRC, when the transmission rate is sufficiently lower than the possible transmission rate, both the packet loss rate and the RTT become small. Accordingly, the calculated possible transmission rate has been assumed to be diverged. In this case, there has been an issue that packet loss frequently occurs when the transmission rate for transmitting data is the diverged possible transmission rate.

In light of the foregoing, it is desirable to provide a novel and improved communication apparatus, a communication system, a program and a communication method which are capable of preventing transmission rate divergence and suppressing packet loss.

According to an embodiment of the present invention, there is provided a communication apparatus which includes a transmission unit which transmits data to an opposite communication apparatus, a physical band measurement unit which measures a physical band against the opposite communication apparatus, and a rate control unit which controls a transmission rate of the transmission unit within a range of the physical band when a previous transmission rate of the transmission unit is below a value of subtracting a predetermined value from the physical band and within a range of exceeding the physical band when the previous transmission rate is beyond the value of subtracting the predetermined value from the physical band.

The predetermined value may be a value acquired by multiplying the physical band by a first coefficient which is smaller than 1.

The range of exceeding the physical band may be acquired based on the larger of a previous transmission rate of the transmission unit or the physical band.

The upper limit of the range of exceeding the physical band may be a value acquired by multiplying the larger of the previous transmission rate of the transmission unit or the physical band by a second coefficient which is equal to or larger than 1.

The communication apparatus may further include a reception unit which receives, from the opposite communication apparatus, information indicating reception status of data transmitted from the transmission unit of the opposite communication apparatus and the rate control unit may calculate a possible transmission rate based on the information received by the reception unit and further control the transmission rate of the transmission unit within a range of the possible transmission rate.

According to another embodiment of the present invention, there is provided a communication system which includes a first communication apparatus and a second communication apparatus. Here, the second communication apparatus includes a transmission unit which transmits data to the first communication apparatus, a physical band measurement unit which measures a physical band against the first communication apparatus, and a rate control unit which controls a transmission rate of the transmission unit within a range of the physical band when a previous transmission rate of the transmission unit is below a value of subtracting a predetermined value from the physical band and within a range of exceeding the physical band when the previous transmission rate is beyond the value of subtracting the predetermined value from the physical band.

According to another embodiment of the present invention, there is provided a program for causing a computer to execute as a transmission unit which transmits data to an opposite communication apparatus, a physical band measurement unit which measures a physical band against the opposite communication apparatus, and a rate control unit which controls a transmission rate of the transmission unit within a range of the physical band when a previous transmission rate of the transmission unit is below a value of subtracting a predetermined value from the physical band and within a range of exceeding the physical band when the previous transmission rate is beyond the value of subtracting the predetermined value from the physical band.

According to another embodiment of the present invention, there is provided a communication method which includes the steps of transmitting data to an opposite communication apparatus, measuring a physical band against the opposite communication apparatus, controlling a transmission rate within a range of the physical band when a previous transmission rate of data is below a value of subtracting a predetermined value from the physical band, and controlling the transmission rate within a range of exceeding the physical band when the previous transmission rate of data is beyond the value of subtracting the predetermined value from the physical band.

As described above, with the communication apparatus, the communication system, the program and the communication method according to the embodiments of the present invention, packet loss can be suppressed while preventing transmission rate divergence.

DETAILED DESCRIPTION OF THE EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Hereinafter, preferred embodiments of the present invention will be described in the following order.

1. The entire configuration of an image communication system according to the embodiment of the present invention
2. The configuration of an image transmission apparatus
3. The configuration of an image reception apparatus
4. Rate control
5. Operation of the image transmission apparatus and the image reception apparatus
6. Summary <1. Entire Configuration of Image Communication System According to the Embodiment of the Present Invention>

First, the entire configuration of an image communication system 1 according to the embodiment of the present invention will be described with reference to FIG. 1.

Figure 1:
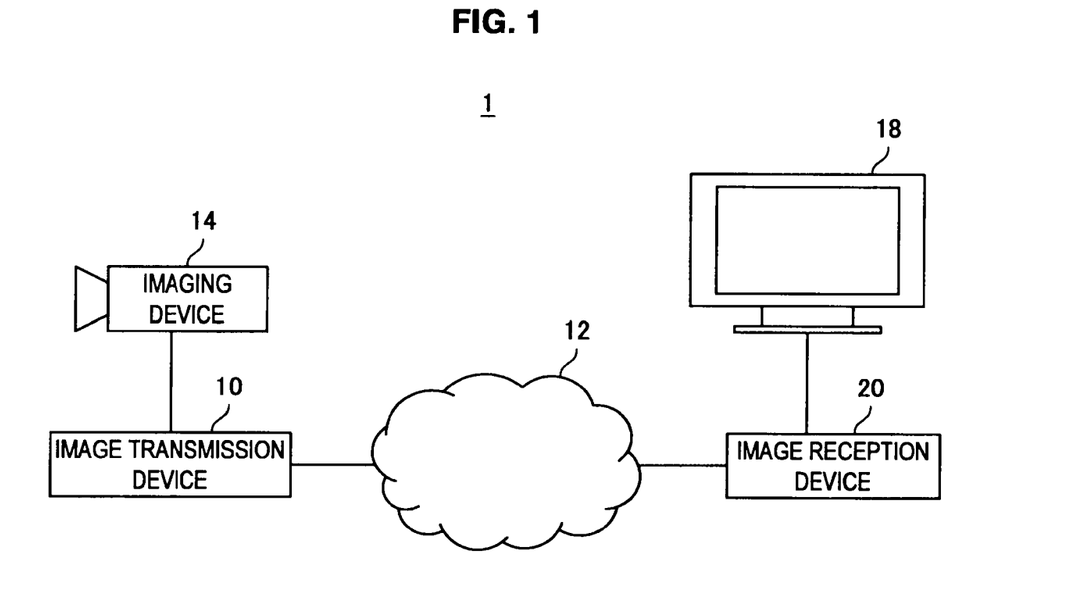
FIG. 1 is an explanatory view which illustrates the entire configuration of an image communication system according to the embodiment of the present invention.

FIG. 1 is an explanatory view which illustrates the entire configuration of the image communication system 1 according to the embodiment of the present invention. As illustrated in FIG. 1, the image communication system 1 includes an image transmission device 10, a network 12, an imaging device 14, a display device 18 and an image reception device 20.

The imaging device 14 takes an image of an object and acquires image data such as a still picture or a dynamic picture. Then, the imaging device 14 provides the image data to the image transmission device 10. In this specification, it is assumed that audio data is added to the image data.

The image transmission device 10 is a communication device which performs encoding the image data provided from the imaging device 14, generating a packet which includes the encoded image data, and transmitting the packet to the image reception device 20 via the network 12. Further, the image transmission device 10 is operated in accordance with TCP friendly rate control (TFRC). That is, when a feed packet including information such as a packet loss rate and round trip time (RTT) is received from the image reception device 20, the image transmission device 10 performs packet transmission control based on the feedback packet.

The network 12 includes a wired link or a wireless link of information transmitted from a device connected to the network 12. For example, the network 12 may include a public network, such as the Internet, a telephone line network and a satellite communication network, and a variety of local area networks (LAN) and wide area networks (WAN) including Ethernet (registered trademark). Further, the network 12 may include a dedicated network such as an internet protocol-virtual private network (IP-VPN).

The reception device 20 is a communication device which performs receiving the transmitted packet from the image transmission device 10 via the network 12, reconstructing image data based on the received packet, and providing the image data to the display device 18 after decoding. Further, the image reception device 20 generates a feedback packet including information regarding a packet loss rate, for example, and transmits to the image transmission device 10 via the network 12.

The display device 18 displays the image data provided from the image reception device 20. The display device 18 may be a cathode ray tube (CRT) display device, a liquid crystal display (LCD) device or an organic light emitting diode (OLED) device, for example.

With the abovementioned image communication system 1, image data communication can be performed in real-time. Accordingly, the image communication system 1 may be adopted to internet telephone, teleconference and an on-demand video system, for example. Here, only a pair of the communication apparatus (i.e., the image transmission device 10 and the image reception device 20) are illustrated in FIG. 1. However, the image communication system 1 may be provided with a plurality of communication devices.

In the example of the above description, the image data is transmitted from the image transmission device 10 to the image reception device 20. However, it is also possible to perform two-way communication of image data by providing a transmission function and a reception function respectively to both the image transmission device 10 and the image reception device 20. Further, in the example of FIG. 1, the communication device such as the image transmission device 10 and the image reception device 20 is configured to be separate from the imaging device 14 and the display device 18. However, the imaging device 14 and the display device 18 may be configured to be integrated with the communication device.

In addition, the abovementioned functions of the image transmission device 10 and the image reception device 20 may be adopted to an internet television system which provides a television program in real-time. In this case, a providing server for television programs functions as the image transmission device 10.

Here, the data to be transmitted from the image transmission device 10 is not limited to image data. For example, the data to be transmitted from the image transmission device 10 may be music data such as music, speech and radio programs or arbitrary data such as games and software.

[Background of the Embodiment of the Present Invention]

In these days, in addition to a download type transmission method having been utilized in related art, services based on a stream type transmission method are increasing as services provided in the Internet. For example, with the download type transmission method, the reception device downloads multimedia such as image data and audio data and replaying can be started after completion of the download. Accordingly, the download type transmission method is not suitable for long-time replay, real-time replay and the like.

Meanwhile, with the stream type transmission method, the reception device can replay the received data while the data transmission is performed. Accordingly, the stream type transmission method has been utilized for internet services such as internet telephone, teleconference and an on-demand video system.

Real-time transport protocol (RTP) defined in IETF and RFC3550 may be listed as internet technology suitable for the stream type transmission method. In the data transmission with RTP, since the transmission device adds a time stamp to a packet as time information, the reception device can perform replaying in synchronization with the transmission device while ascertaining time relation therewith out being affected by delay fluctuation (i.e., jitter) of packet transmission.

Here, priority, setting and managing of the packet transmission are beyond the confines of the transport service provided by RTP. Therefore, actual time of data transmission is not ensured by RTP. Accordingly, there may be a case that transmission delay or packet loss occurs at the packet which is transmitted in accordance with RTP. In this case, the reception device is capable of replaying data by utilizing the packet received within predetermined time.

Here, since a user datagram protocol (UDP) does not perform rate control of streaming, it may be assumed that data transmission is performed at the rate exceeding an effective band of a network. As a result, data is lost due to packet loss and data replaying quality is deteriorated. Further, other traffic on the network is affected.

On the contrary, reliability of data transmission may be improved by adopting rate control based on TFRC. With TFRC, a possible transmission rate T (i.e., an ideal transmission rate, an effective band) at one time point is expressed by the following equation 1 utilizing a packet loss rate (p), a packet size (s), a constant ($t_{RTP}$) and the RTT (R).

[Equation 1]

$$T=s/(R\sqrt{(2p/3)}+t_{RTP}3\sqrt{(3p/8)} \times p(1+32p^2)) \quad (1)$$

Here, there is a case that the transmission device can transmit data only at a low transmission rate in view of applications, encoding or the like. For example, when object movement in the image data to be transmitted becomes small, data amount of the image data after encoding becomes small as well. Accordingly, the transmission rate is lowered. In this case, since the packet loss rate (p) and the RTT (R) are to be extremely small, the possible transmission rate T is diverged as illustrated in FIG. 2.

Figure 2:
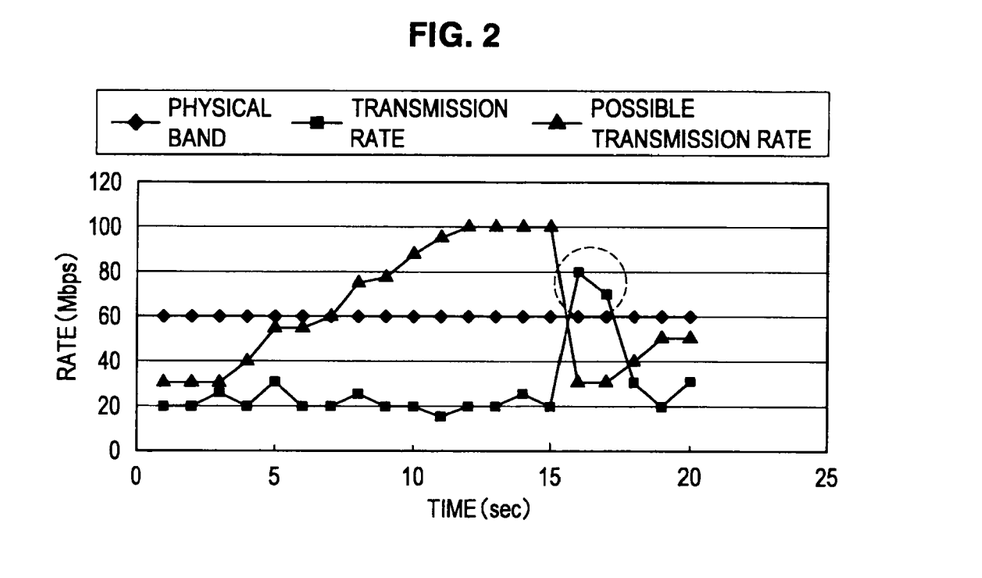
FIG. 2 is an explanatory graph which illustrates the relation between a possible transmission rate and a transmission rate.

FIG. 2 is an explanatory graph which illustrates the relation between the possible transmission rate and the transmission rate. As illustrated in FIG. 2, in the case that the transmission rate is the order of 20 Mbps being sufficiently low against a physical band of 60 Mbps (i.e., 0 to 15 seconds), the possible transmission rate is being increased to exceed the physical band. In this case, when the transmission rate is not restricted for applications and encoding, data is transmitted at the transmission rate exceeding the physical band as illustrated by a dotted line in FIG. 2. Consequently, there have been fears of occurrence of a large amount of packet loss.

The image communication system 1 according to the embodiment of the present invention has been devised in view of the abovementioned circumstances. With the image communication system 1 according to the embodiment of the present invention, the packet loss can be suppressed by controlling the transmission rate within an appropriate range. In the following, the image transmission device 10 and the image reception device 20 which constitute the image communication system 1 will be described in detail.

<2. Configuration of Image Transmission Device>

Figure 3:
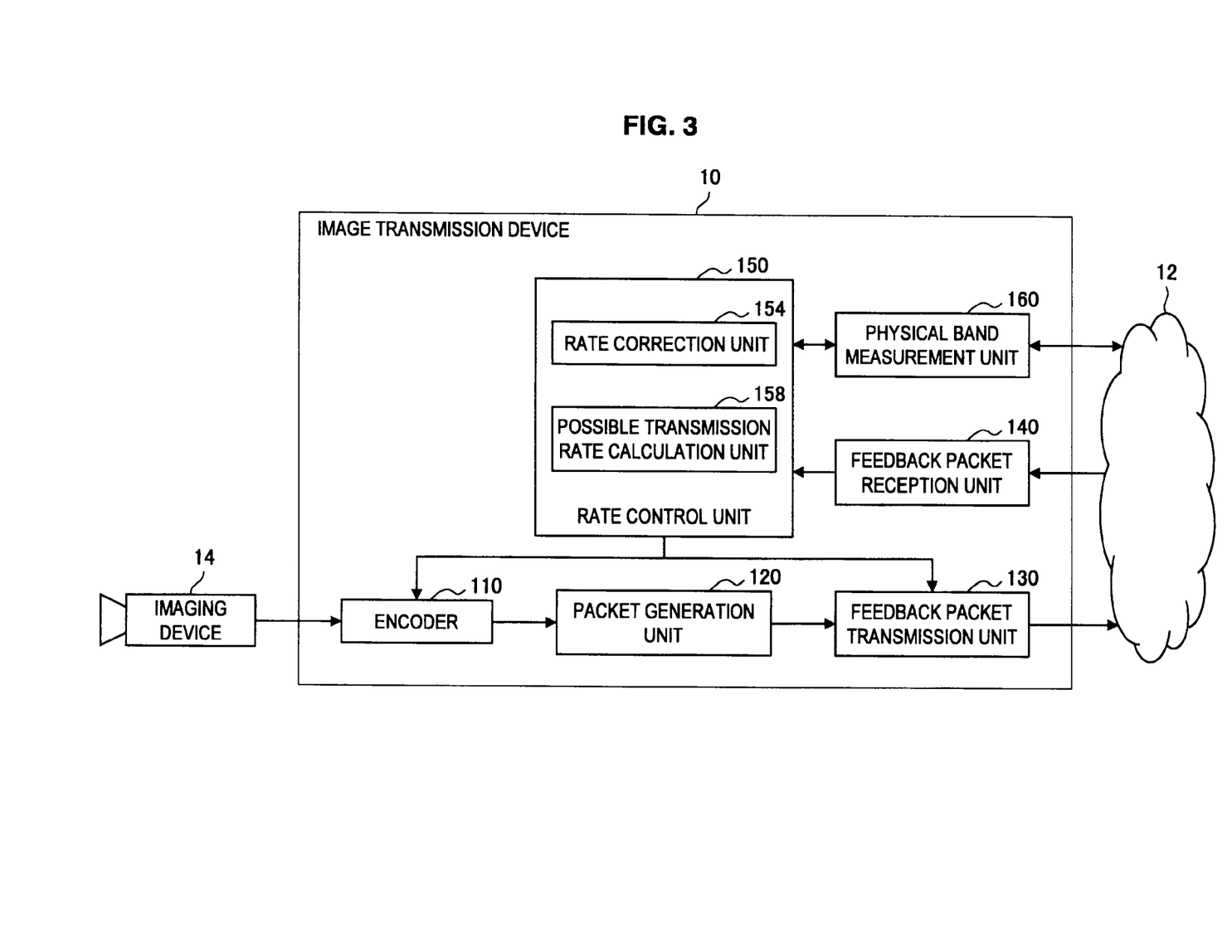
FIG. 3 is a functional block diagram which illustrates the configuration of an image transmission device according to the embodiment of the present invention.

FIG. 3 is a functional block diagram which illustrates the configuration of the image transmission device 10 according to the embodiment of the present invention. As illustrated in FIG. 3, the image transmission device 10 includes an encoder 110, a packet generation unit 120, a feedback packet transmission unit 130, a feedback packet reception unit 140, a rate control unit 150 and a physical band measurement unit 160.

The encoder 110 encodes the image data provided from the imaging device 14 at a frame rate so that the transmission rate is to be within the range of the possible transmission rate in accordance with the possible transmission rate notified by the rate control unit 150. Here, for example, JPEG (Joint photographical coding experts group), JPEG 2000, Motion JPEG, AVC (Advanced video coding), MPEG1 (Moving picture experts group 1), MPEG2, MPEG 4 and the like may be listed for an encoding method.

The packet generation unit 120 generates a packet based on the image data encoded by the encoder 110 and provides to the feedback packet transmission unit 130. Specifically, the packet generation unit 120 generates a packet by dividing the image data encoded by the encoder 110 and adding a TCP/IP header to the divided image data. Alternately, the packet generation unit 120 may generates a packet by adding a UDP/IP header to the divided image data. Here, a sequence number to discriminate each packet is included in the header.

The feedback packet transmission unit 130 transmits the packet provided from the packet generation unit 120 to the image reception device 20 at timing controlled by the rate control unit 150 in accordance with RTP. When transmitting the packet, the feedback packet transmission unit 130 records current time at the header as the time stamp.

The feedback packet reception unit 140 receives a feedback packet transmitted from the image reception device 20 via the network 12. The feedback packet includes the packet loss rate, the RTT and the like as the information indicating reception status of the packet at the image reception device 20. The feedback packet reception unit 140 provides such information included in the feedback packet to the rate control unit 150.

The rate control unit 150 includes a rate correction unit 154 and a TFRC-based possible transmission rate calculation unit 158. Then, the rate control unit 150 controls the possible transmission rate to be notified to the encoder 110 based on the information provided from the feedback packet reception unit 140 and the physical band measured by the physical band measurement unit 160. Here, the rate control unit 150 may notify to the encoder 110 after setting the transmission rate at a value within the range of the possible transmission rate.

The possible transmission rate calculation unit 158 calculates the possible transmission rate by substituting the packet loss rate and the RTT provided from the feedback packet reception unit 140 into the abovementioned equation 1. In the embodiment of the present invention, the possible transmission rate calculated by the possible transmission rate calculation unit 158 is not necessarily used as it is. In the case that the possible transmission rate exceeds the physical band, the rate correction unit 154 corrects the possible transmission rate as necessary. The correction of the possible transmission rate will be specifically described with reference to FIGS. 5 to 8.

The physical band measurement unit 160 measures the physical band between the image transmission device 10 and the image reception device 20. Here, the physical band is assumed to be the maximum rate which can be actualized between the image transmission device 10 and the image reception device 20 in the case without other traffic and the like. The physical band may be measured with a measurement method such as "Packet Pair", "Packet Triple" and ImTCP.

<3. Configuration of Image Reception Device>

Next, the configuration of the image reception device 20 according to the embodiment of the present invention will be described with reference to FIG. 4.

Figure 4:
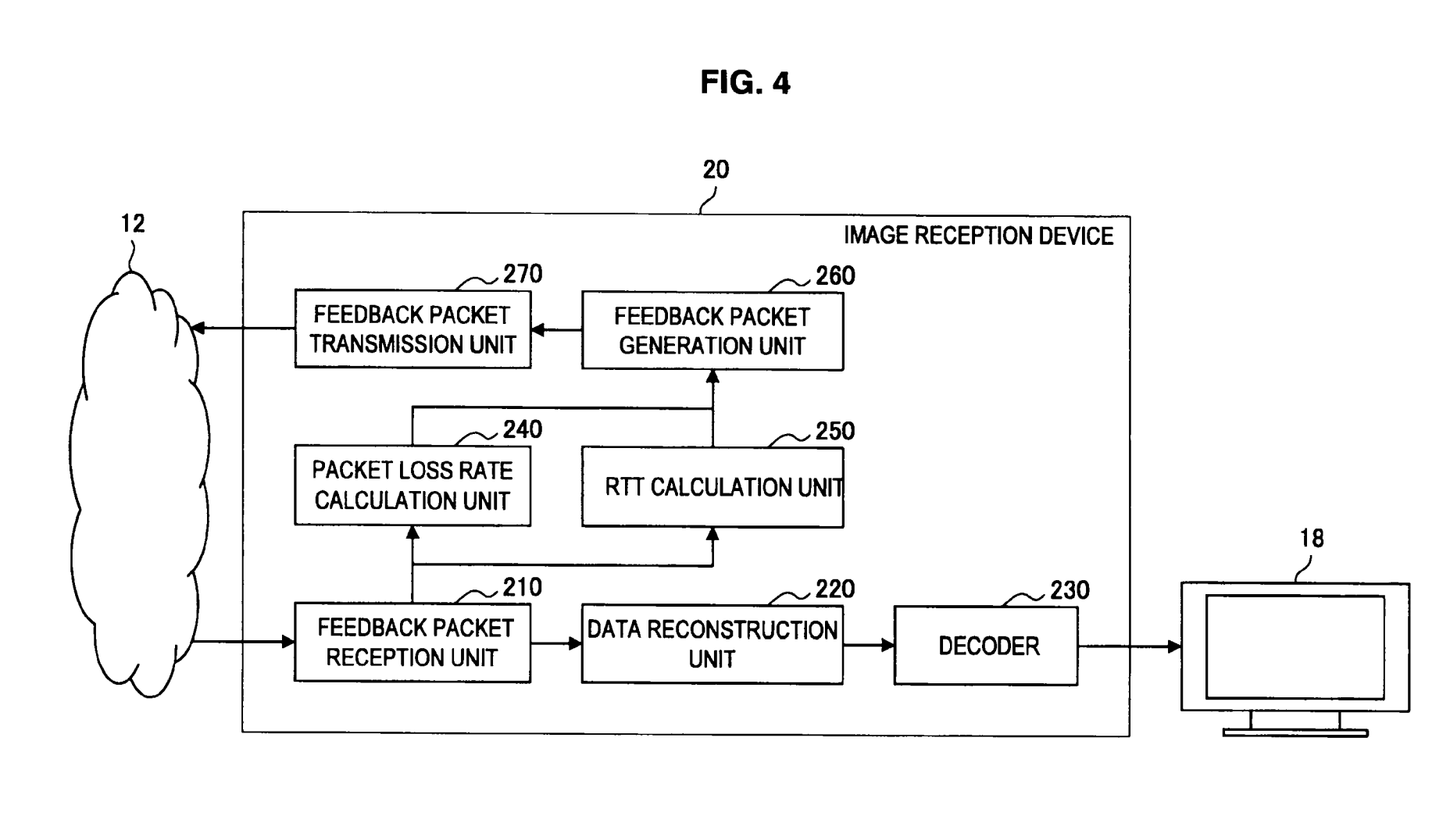
FIG. 4 is a functional block diagram which illustrates the configuration of an image transmission device according to the embodiment of the present invention.

FIG. 4 is a functional block diagram which illustrates the configuration of the image reception device 20 according to the embodiment of the present invention. As illustrated in FIG. 4, the image reception device 20 includes a feedback packet reception unit 210, a data reconstruction unit 220, a decoder 230, a packet loss rate calculation unit 240, an RTT calculation unit 250, a feedback packet generation unit 260 and a feedback packet transmission unit 270.

The feedback packet reception unit 210 receives the packet transmitted from the image transmission device 10. Then, the feedback packet reception unit 210 provides the received packet to the data reconstruction unit 220 and provides the sequence number included in the header to the packet loss rate calculation unit 240. In addition, the feedback packet reception unit 210 provides transmission time of the received packet to the RTT calculation unit 250.

The data reconstruction unit 220 reconstructs the image data based on the packet provided from the feedback packet reception unit 210. Each packet includes the divided image data. Accordingly, the data reconstruction unit 220 reconstructs the image data by combining a plurality of the divided image data included in a plurality of the packets.

The decoder 230 decodes the image data reconstructed by the data reconstruction unit 220 and provides the decoded image data to the display device 18. Accordingly, the image data taken by the imaging device 14 can be displayed by the display device 18 in real-time.

The packet loss rate calculation unit 240 detects packet loss based on the sequence number provided from the feedback packet reception unit 210 and calculates the packet loss rate.

Specifically, the packet loss rate calculation unit 240 detects the packet loss by detecting whether or not the preceding sequence number provided from the feedback packet reception unit 210 and the sequence number newly provided from the feedback packet reception unit 210 are successive. That is, the packet loss rate calculation unit 240 detects existence of a packet which has been transmitted from the image transmission device 10 but has not been received by the image reception device 20. In addition, the packet loss rate calculation unit 240 specifies the sequence number of the lost packet.

For example, assuming that the preceding sequence number provided from the feedback packet reception unit 210 is "56" and the sequence number newly provided from the feedback packet reception unit 210 is "58". In this case, since the sequence numbers are not successive, the packet loss rate calculation unit 240 detects the loss of the packet having the sequence number of "57" being between "56" and "58".

In addition, the packet loss rate calculation unit 240, for example, calculates the packet loss rate per unit time from the number of loss-detected packets and provides to the feedback packet generation unit 260.

Further, the RTT calculation unit 250 provides, to the feedback packet generation unit 260, transmission time of the packet provided from the feedback packet reception unit 210 and process delay time at the image reception device 20.

The feedback packet generation unit 260 generates a feedback packet including the packet loss rate calculated by the packet loss calculation unit 240 and the packet transmission time and process delay time provided from the RTT calculation unit 250.

The feedback packet transmission unit 270 transmits the feedback packet generated by the feedback packet generation unit 260 to the image transmission device 10 at predetermined timing. Consequently, as described above, the image transmission device 10 becomes capable of calculating the possible transmission rate based on the packet loss rate and the RTT. Here, the image transmission device 10 is capable of calculating the RTT with the following equation 2, for example. Reception time in equation 2 is the time at which the image transmission device 10 receives the feedback packet.

[Equation 2]

$$RTT = (\text{Reception time} - \text{Transmission time}) - \text{Process delay time} \quad (2)$$

In the example of the above description, the feedback packet includes the packet loss rate. However, the feedback packet may include information to specify the packet loss rate at the image transmission device 10. Specifically, the feedback packet may include the sequence number and the like of the loss-detected packet.

<4. Rate Control>

Next, functions of the rate control unit 150 of the image transmission device 10 will be described in detail with reference to FIGS. 5 to 8.

The possible transmission rate calculation unit 158 calculates the possible transmission rate by substituting the packet loss rate and the RTT provided from the feedback packet reception unit 140 into the abovementioned equation 1. In the case that the possible transmission rate exceeds the physical band, the rate correction unit 154 corrects the possible transmission rate as necessary.

Figure 5:
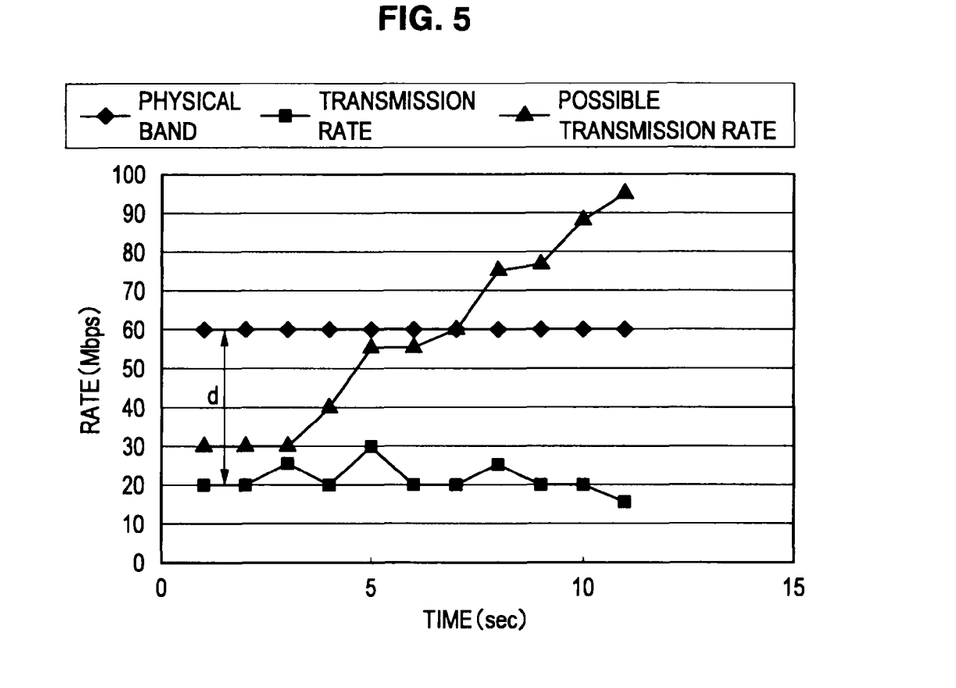
FIG. 5 is an explanatory graph which illustrates the possible transmission rate calculated with an ordinary method.
Figure 6:
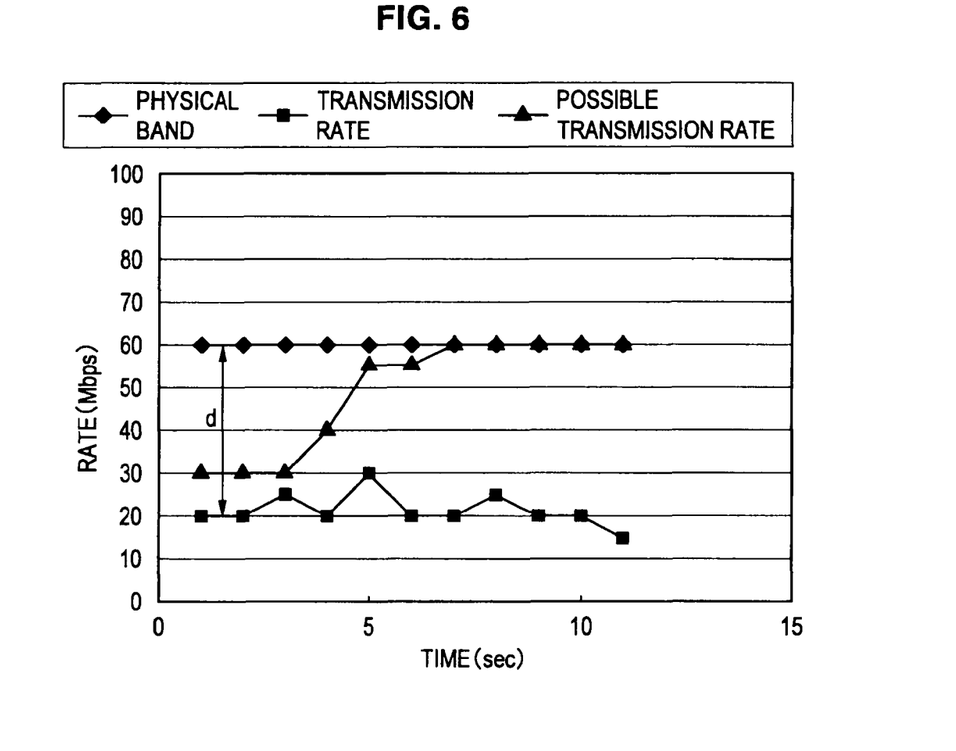
FIG. 6 is an explanatory graph which illustrates the possible transmission rate acquired in the embodiment of the present invention.

For example, in the case that the previous transmission rate (i.e., the rate of data actually transmitted, the transmission rate set at preceding time) is below the value of subtracting a predetermined value from the physical band, the rate correction unit 154 corrects the possible transmission rate to be into the physical band. That is, when the difference d between the previous transmission rate and the physical band exceeds the predetermined value, the possible transmission rate is corrected into the physical band. Here, the predetermined value may be the value of multiplying the physical band by a first coefficient which is smaller than 1 (for example, one third).

FIG. 5 is an explanatory graph which illustrates the possible transmission rate calculated with an ordinary method. FIG. 6 is an explanatory graph which illustrates the possible transmission rate acquired in the embodiment of the present invention.

With the ordinary method, the packet loss rate and the RTT become small when the transmission rate is sufficiently low against the physical band of 60 Mbps. Accordingly, the possible transmission rate is to be diverged as illustrated in FIG. 5. On the other hand, in the embodiment of the present invention, when the difference d between the transmission rate and the physical band is larger than the predetermined value (for example, 20 Mbps being one third of the physical band), the possible transmission rate is restricted to the physical band. As a result, since the transmission rate is controlled within the range of the physical band, the packet loss caused by an excessive transmission rate can be suppressed.

Figure 7:
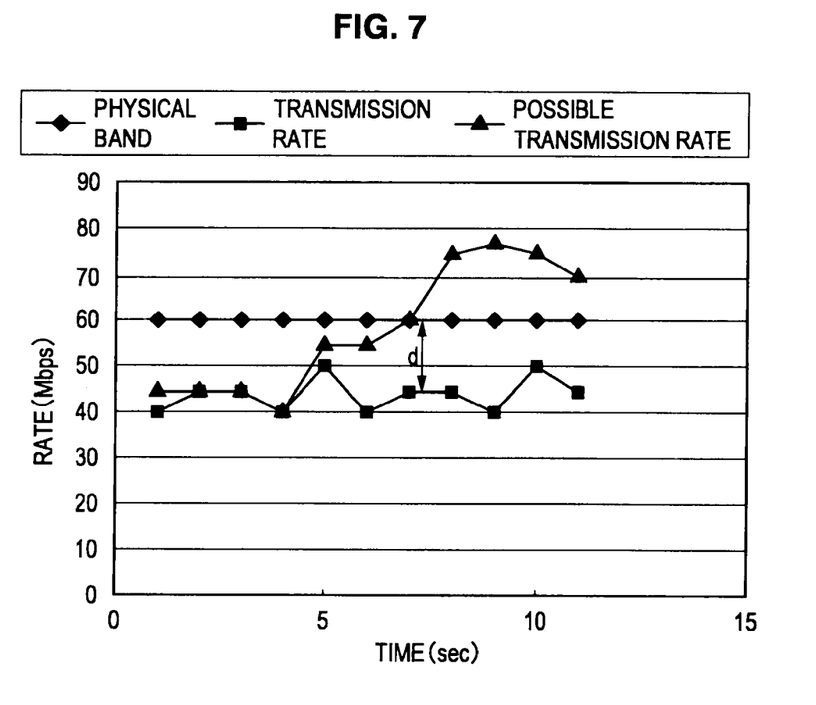
FIG. 7 is an explanatory graph which illustrates the possible transmission rate calculated with an ordinary method.
Figure 8:
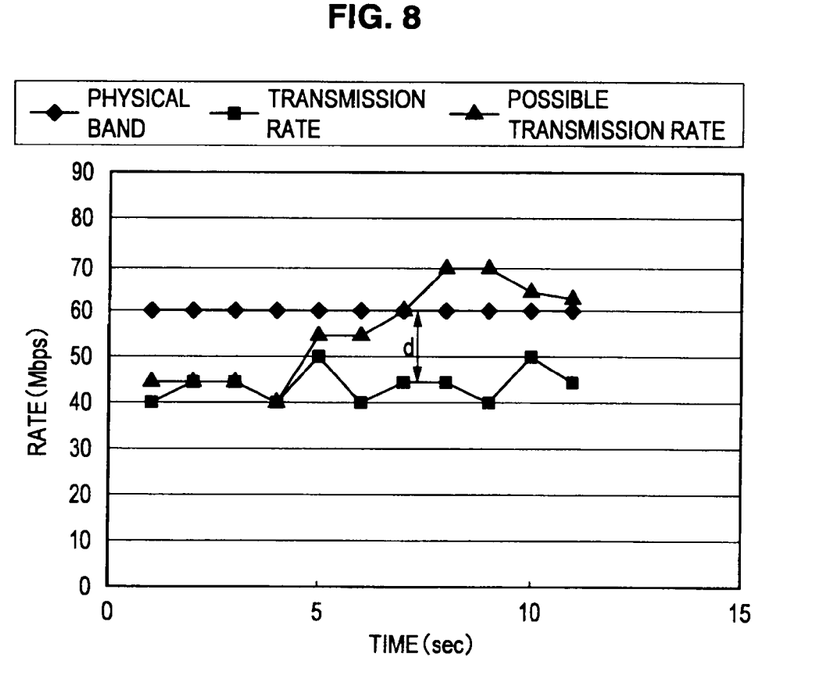
FIG. 8 is an explanatory graph which illustrates the possible transmission rate acquired in the embodiment of the present invention.

Meanwhile, in the case that the previous transmission rate exceeds the value of subtracting the predetermined value from the physical band, the rate correction unit 154 corrects the possible transmission rate to the value equal to or higher than the physical band. This is because there is a case that the physical band acquired through measurement by the physical band measurement unit 160 is lower than the proper physical band, so that uniform restriction of the possible transmission rate to the physical band may be considered to be inappropriate.

Specifically, the rate correction unit 154 may calculate a restriction rate by multiplying the higher of the previous transmission rate or the physical band by a second coefficient r which is equal to or larger than 1 (for example, 1.1 to 1.3, 1.1 to 1.4) and determine the possible transmission rate to be the lower of the restriction rate or the possible transmission rate. Here, the second coefficient r may be set for each application.

FIG. 7 is an explanatory graph which illustrates the possible transmission rate calculated with the ordinary method. FIG. 8 is an explanatory graph which illustrates the possible transmission rate acquired in the embodiment of the present invention. As illustrated in FIG. 8, in the embodiment of the present invention, when difference d between the transmission rate and the physical band is smaller than a predetermined value (for example, one third of the physical band), excessive amount of the possible transmission rate against the physical band is suppressed compared to the case with the ordinary method. Accordingly, the proper physical band can be further utilized while suppressing the packet loss caused by excessive transmission rate.

<5. Operation of Image Transmission Device and Image Reception Device>

Subsequently, operation of the image transmission device 10 and the image reception device 20 will be described with reference to FIGS. 9 and 10.

Figure 9:
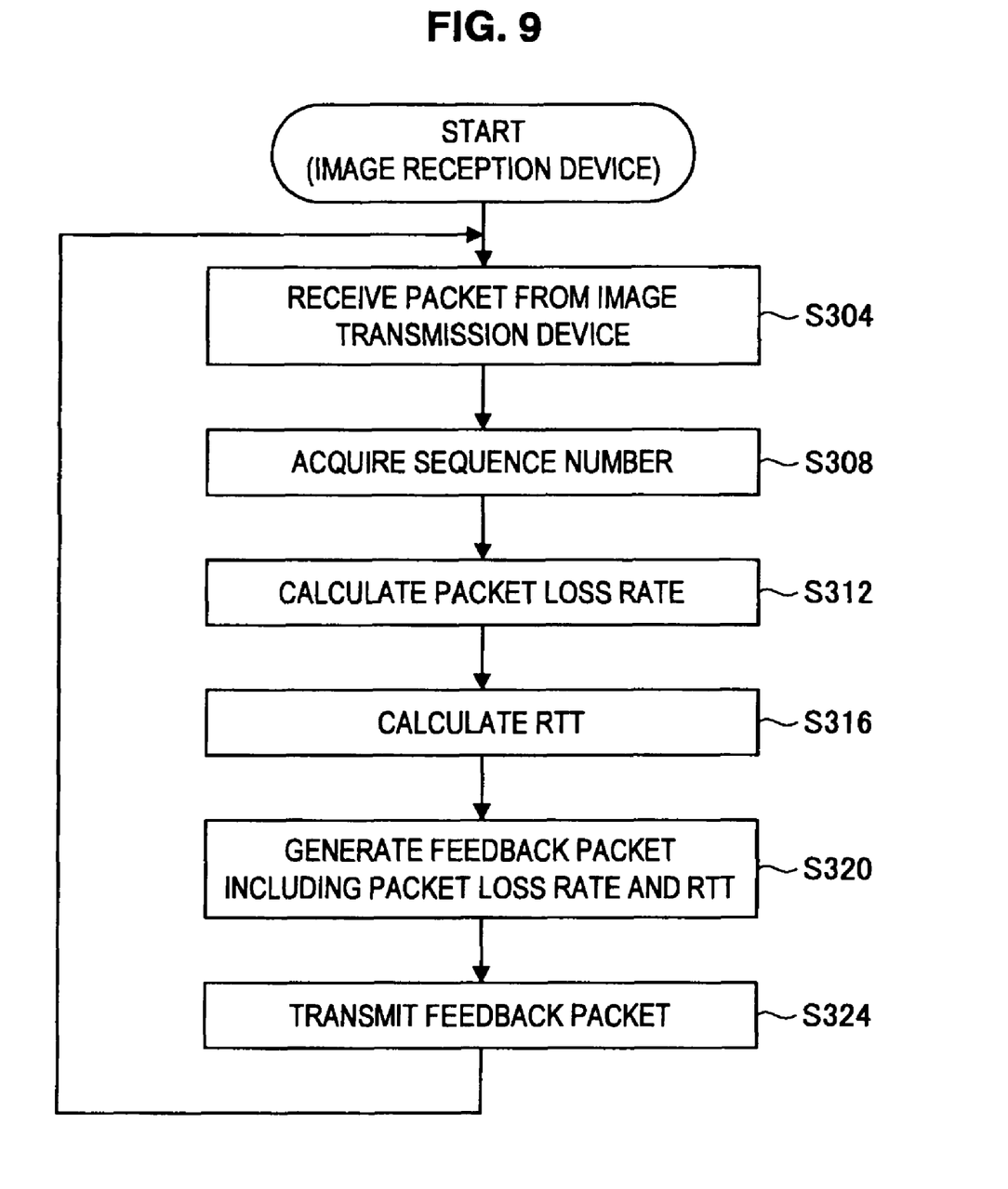
FIG. 9 is a flowchart which indicates operational flow of the image reception device according to the embodiment of the present invention.

FIG. 9 is a flowchart which indicates operational flow of the image reception device 20 according to the embodiment of the present invention. First, when the feedback packet reception unit 210 of the image reception device 20 receives a packet from the image transmission device 10 (S304), the sequence number is acquired from the header of the packet and provided to the packet loss rate calculation unit 240 (S308), as indicated in FIG. 9.

Then, the packet loss rate calculation unit 240 calculates the packet loss rate based on continuity of the provided sequence numbers (S312). Further, the feedback packet reception unit 210 provides, to the RTT calculation unit 250, the packet reception time and the packet transmission time added as the time stamp to the packet. The RTT calculation unit 250 calculates the RTT based on the reception time and the transmission time (S316). Here, it is also possible to calculate the RTT at the image transmission device 10 side with the method described with reference to equation 2.

Subsequently, the feedback packet generation unit 260 generates the feedback packet including the packet loss rate calculated by the packet loss calculation unit 240 and the RTT calculated by the RTT calculation unit 250 (S320). Then, the feedback packet transmission unit 270 transmits the feedback packet to the image transmission device 10 (S324). Here, concurrently to the above process, the data reconstruction unit 220 and the decoder 230 of the image reception device 20 perform reconstructing and decoding of the image data. Then, the image data is provided to the display device 18 and the display device 18 displays the image data.

Figure 10:
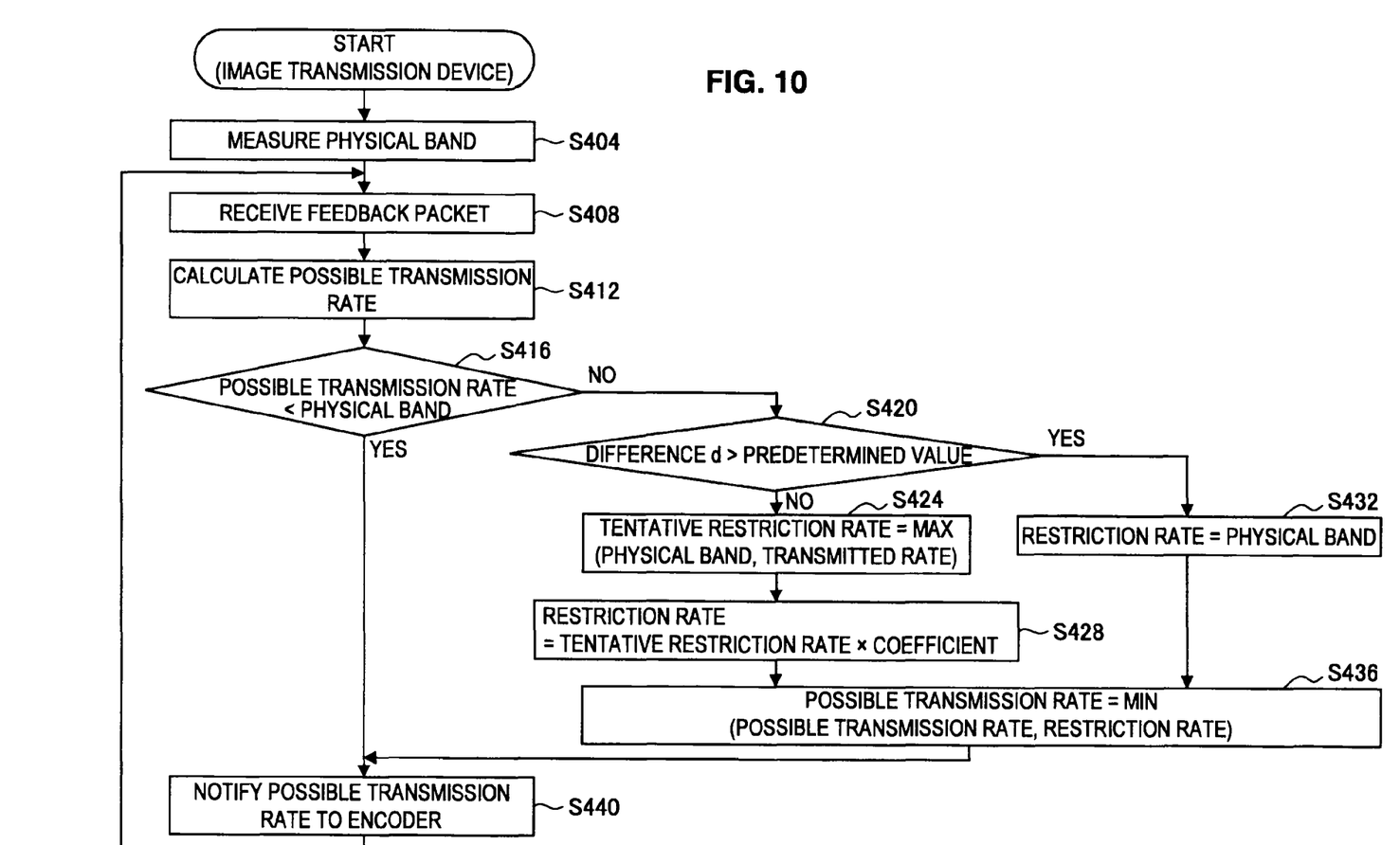
FIG. 10 is a flowchart which indicates operational flow of the image reception device according to the embodiment of the present invention

FIG. 10 is a flowchart which indicates operational flow of the image transmission device 10 according to the embodiment of the present invention. As indicated in FIG. 10, first, the physical band measurement unit 160 of the image transmission device 10 measures the physical band between the image transmission device 10 and the image reception device 20 (S404). Subsequently, when the feedback packet reception unit 140 receives the feedback packet from the image reception device 20 (S408), the possible transmission rate calculation unit 158 calculates the possible transmission rate in accordance with equation 1 (S412).

Then, in the case that the possible transmission rate calculated in S412 exceeds the physical band measured in S404 (S416), the rate correction unit 154 determines whether or not the difference d between the previous transmission rate and the physical band exceeds the predetermined value (S420). Here, when the difference d does not exceed the predetermined value, the correction rate 154 selects the higher of the previous transmission rate or the physical band as a tentative restriction rate (S424), and then, the restriction rate is calculated by multiplying the tentative restriction rate by the second coefficient r (S428). On the other hand, when the difference d exceeds the predetermined value, the rate correction unit 154 sets the restriction rate at the physical band (S432).

Further, the rate correction unit 154 selects the lower of the restriction rate and the possible transmission rate calculated in S412 as the possible transmission rate (S436). Subsequently, the rate correction unit 154 notifies the possible transmission rate to the encoder 110 (S440). When the physical band calculated in S412 is below the physical band measured in S404 (S416), the possible transmission rate calculated in S412 is notified to the encoder 110 without being corrected. Subsequently, the processes from S408 are repeated.

<6. Summary>

As described above, in the embodiment of the present invention, the possible transmission rate can be appropriately restricted even in the case that the transmission rate cannot be raised to be close to the physical band and possible transmission rate estimation based on TFRC is difficult due to decrease of the packet loss rate and the RTT. Consequently, the transmission rate is prevented from exceeding the physical band by a large amount and the packet loss rate can be suppressed. In addition, in the embodiment of the present invention, since steep increase in the transmission rate can be prevented, rate control can be performed appropriately for image transmission.

It should be understood by those skilled in the art that various modifications, combinations, sub-combinations and alterations may occur depending on design requirements and other factors insofar as they are within the scope of the appended claims or the equivalents thereof.

For example, each step in the processes of the image transmission device 10 and the image reception device 20 of the present specification is not necessarily performed in time sequence of the order described in the flowcharts. For example, each step in the processes of the image transmission device 10 and the image reception device 20 may include a process which is concurrently or separately performed (for example, a concurrent process or a process by an object).

Further, it is also possible to prepare a computer program to operate hardware such as a CPU, a ROM and a RAM integrated by the image transmission device 10 and the image reception device 20 to execute the similar functions of the respective components of the image transmission device 10 and the image reception device 20. In addition, a storage medium to store the computer program is provided. Furthermore, by constituting each function block illustrated in the functional block diagrams of FIGS. 3 and 4 with hardware, the series of processes can be performed with the hardware.

The present application contains subject matter related to that disclosed in Japanese Priority Patent Application JP 2009-012276 filed in the Japan Patent Office on Jan. 22, 2009, the entire content of which is hereby incorporated by reference.

What is claimed is:

1. A communication apparatus comprising:
a memory and a Central Processing Unit (CPU);
a transmission unit which transmits data to an opposite communication apparatus;
a physical band measurement unit which measures a physical band against the opposite communication apparatus; and
a rate control unit which controls a transmission rate of the transmission unit within a range of the physical band when a previous transmission rate of the transmission unit is below a value of subtracting a predetermined value from the physical band and within a range of exceeding the physical band when the previous transmission rate is beyond the value of subtracting the predetermined value from the physical band.

2. The communication apparatus according to claim 1, wherein the predetermined value is a value acquired by multiplying the physical band by a first coefficient which is smaller than 1.

3. The communication apparatus according to claim 2, wherein the range of exceeding the physical band is acquired based on the larger of a previous transmission rate of the transmission unit or the physical band.

4. The communication apparatus according to claim 3, wherein the upper limit of the range of exceeding the physical band is a value acquired by multiplying the larger of the previous transmission rate of the transmission unit or the physical band by a second coefficient which is equal to or larger than 1.

5. The communication apparatus according to claim 4, further comprising a reception unit which receives, from the opposite communication apparatus, information indicating reception status of data transmitted from the transmission unit of the opposite communication apparatus, wherein the rate control unit calculates a possible transmission rate based on the information received by the reception unit and further controls the transmission rate of the transmission unit within a range of the possible transmission rate.

6. A communication system comprising:
a first communication apparatus; and
a second communication apparatus; wherein the second communication apparatus includes: a transmission unit which transmits data to the first communication apparatus;
a physical band measurement unit which measures a physical band against the first communication apparatus; and
a rate control unit which controls a transmission rate of the transmission unit within a range of the physical band when a previous transmission rate of the transmission unit is below a value of subtracting a predetermined value from the physical band and within a range of exceeding the physical band when the previous transmission rate is beyond the value of subtracting the predetermined value from the physical band.

7. A program for causing a computer to execute as:
a transmission unit which transmits data to an opposite communication apparatus;
a physical band measurement unit which measures a physical band against the opposite communication apparatus; and
a rate control unit which controls a transmission rate of the transmission unit within a range of the physical band when a previous transmission rate of the transmission unit is below a value of subtracting a predetermined value from the physical band and within a range of exceeding the physical band when the previous transmission rate is beyond the value of subtracting the predetermined value from the physical band.

8. A communication method comprising the steps of:
transmitting data to an opposite communication apparatus;
measuring a physical band against the opposite communication apparatus;
controlling a transmission rate within a range of the physical band when a previous transmission rate of data is below a value of subtracting a predetermined value from the physical band; and
controlling the transmission rate within a range of exceeding the physical band when the previous transmission rate of data is beyond the value of subtracting the predetermined value from the physical band.

* * * * *